(12) United States Patent
Kwon et al.

(10) Patent No.: US 8,692,852 B2
(45) Date of Patent: Apr. 8, 2014

(54) INTELLIGENT DISPLAY METHOD FOR MULTIMEDIA MOBILE TERMINAL

(75) Inventors: Jae-Hoon Kwon, Seongnam-si (KR); Jeong-Rok Park, Hwaseong-si (KR); Young-Hun Joo, Yongin-si (KR); Yun-Je Oh, Yongin-si (KR); Chang-Ick Kim, Daejeon (KR); Il-Koo Ahn, Jeollabuk-do (KR); Jae-Seung Ko, Seoul (KR)

(73) Assignees: Samsung Electronics Co., Ltd., Samsung-ro, Yeongtong-gu, Suwon-si, Gyeonggi-do (KR); Korea Advanced Institute of Science and Technology (KAIST), Guseong-dong, Yuseong-gu, Daejeon (KR)

( * ) Notice: Subject to any disclaimer, the term of this patent is extended or adjusted under 35 U.S.C. 154(b) by 1452 days.

(21) Appl. No.: 11/890,176

(22) Filed: Aug. 3, 2007

(65) Prior Publication Data
US 2008/0030515 A1    Feb. 7, 2008

(30) Foreign Application Priority Data
Aug. 3, 2006   (KR) .................. 10-2006-0073300

(51) Int. Cl.
*G06T 3/40*   (2006.01)
*G09G 5/373*   (2006.01)

(52) U.S. Cl.
USPC ............................ 345/667; 345/625; 348/157

(58) Field of Classification Search
CPC .............................................. G09G 2340/045
USPC .................. 345/660, 667, 625, 628; 348/157, 348/240.2, 445, 458, 581
See application file for complete search history.

(56) References Cited

U.S. PATENT DOCUMENTS

| 2006/0061602 A1 * | 3/2006 | Schmouker et al. .......... 345/660 |
| 2007/0242088 A1 * | 10/2007 | Kim et al. ..................... 345/660 |

FOREIGN PATENT DOCUMENTS

| KR | 1999-33641 | 5/1999 | ............... H04N 3/22 |
| KR | 2003-27440 | 4/2003 | ............... G03B 7/00 |
| KR | 2004-62732 | 7/2004 | ............... H04N 7/24 |
| KR | 2004-79804 | 9/2004 | ............... H04N 7/18 |
| KR | 2006-28802 | 3/2006 | ............... H04N 7/01 |
| KR | 2006-60630 | 6/2006 | ............... H04N 7/01 |

OTHER PUBLICATIONS

Machine translation of Korean Publication No. 10-2006-0060630 by K-PION (Korean Patent Information Online Network), Sep. 21, 2010, 59 pages.*

(Continued)

*Primary Examiner* — Jeffery A Brier
(74) *Attorney, Agent, or Firm* — Cha & Reiter, LLC

(57) ABSTRACT

Disclosed is an intelligent display method for a multimedia mobile terminal. The method includes the steps of determining a type of a camera shot existing in a sport game video; deciding a region of interest within an image frame of the sport game video when it has been determined that the camera shot is a long-distance shot, magnifying the region of interest, and displaying the region of interest on the mobile terminal, and displaying the entire image frame on the mobile terminal when it has been determined that the video shot is a non-long-distance shot. The method enables the user to watch images in a more understandable and comfortable manner.

16 Claims, 12 Drawing Sheets
(8 of 12 Drawing Sheet(s) Filed in Color)

(56) References Cited

OTHER PUBLICATIONS

Machine translation of Korean Registration No. 10-0810345 by K-PION (Korean Patent Information Online Network), Sep. 21, 2010, 43 pages.*

Machine translation of Korean Office's Oct. 11, 2007 Notification of Reason for Refusal for Korean Application No. 10-2006-0073300 by K-PION (Korean Patent Information Online Network), Sep. 22, 2010, 8 pages.*

Xin Fan, Xing Xie, He-Qin Zhou, Wei-Ying Ma; Looking into Video Frames on Small Displays; 2003; International Multimedia Conference, Proceedings of the eleventh ACM international conference on Multimedia; pp. 247-250.*

Keewon Seo and Changick Kim; A Context-Aware Video Display Scheme for Mobile Devices; Conference date: Monday Jan. 16, 2006; Online Publication Date: Feb. 10, 2006; Proc. SPIE Multimedia on Mobile Devices II, San Jose, vol. 6074, 60740V (2006); 10 pages.*

Knoche, H., et al.; "Can Small Be Beautiful? Assessing Image Resolution Requirements for Mobile TV;" Multimedia '05: Proceedings of 13$^{th}$ annual ACM Int'l Conference on Multimedia; New York, NY 2005, 10 pages.

Itti, L., et al.; "A Model of Saliency-Based Visual Attention for Rapid Scene Analysis," IEEE Transactions on Pattern Analysis and Machine Intelligence; vol. 20, No. 11; Nov. 1998, 5 pages.

Cheng, W.H., et al.; "A Visual Attention Based Region-of-Interest Determination Framework for Video Sequences;" IEICE Transactions on Information and Systems, E-88D, 2005, pp. 1578-1586.

Ma, Y.F., et al.; "A Model of Motion Attention for Video Skimming;" in Proc. ICIP, 2002, 4 pages.

* cited by examiner

INTELLIGENT DISPLAY METHOD FOR MULTIMEDIA MOBILE TERMINAL

CLAIM OF PRIORITY

This application claims the benefit under 35 U.S.C. §119(a) of an application entitled "Intelligent Display Method for Multimedia Mobile Terminal," filed in the Korean Intellectual Property Office on Aug. 3, 2006 and assigned Serial. No. 2006-73300, the entire contents of which are hereby incorporated by reference.

BACKGROUND OF THE INVENTION

1. Field of the Invention

The present invention relates to a display method for a multimedia mobile terminal, and more particularly to an intelligent display method for a multimedia mobile terminal, wherein, when the mobile terminal displays a sport game video, the entire frame is displayed in the case of a non-long-distance shot, but, in the case of a long-distance shot, in which objects appear smaller, only the region of interest existing within the shot is magnified and displayed.

2. Description of the Related Art

An increasing number of people watch videos via small LCD panels as a result of the rapid development of multimedia signal processing and transmission technologies, as well as the appearance of new types of mobile TV services, including DVB-H (Digital Video Broadcasting-Handheld) and DMB (Digital Multimedia Broadcasting). However, most service providers simply reduce conventional images and provide them as mobile broadcasts primarily for cost-related reasons.

Experiments conducted by Knoche et al. to determine conditions (pixel number, bit rate, etc.) suitable for displaying reduced images via mobile terminals are described in a paper by H. Knoche, J. D. McCarthy, and M. A. Sasse, entitled "Can small be beautiful?: assessing image resolution requirements for mobile TV", in MULTIMEDIA '05: Proceedings of the 13th annual ACM international conference on Multimedia, pp. 829-838, ACM Press (New York, N.Y., USA), 2005. The experimental results show that, when images are directly reduced for display via compact terminals, visual details are lost. Such a loss is more severe when images are related to field sports, particularly in the case of a soccer video. The loss lessens little by little in the order of music videos, news, and animation videos.

One solution to this problem of loss of detail is to develop intelligent display technology so that, in the case of a video containing specific contents, only the region of interest (hereinafter, referred to as ROI) is magnified and displayed to the user of a compact mobile terminal via the screen. As used herein, the ROI refers to a region of the screen, in which users are most interested, or to which users pay more attention than other regions. The ROI is used for situation recognition content adaptation, transcoding, intelligent information management, and the like. In addition, designation of the ROI may be the first step for analyzing video scenes in terms of their meaning. Therefore, such technology is very important also with regard to image analysis.

FIG. 1 illustrates three types of shots existing in a conventional sport game video. In the drawing, (a) refers to a long-distance shot, (b) refers to a medium-distance shot, and (c) refers to a short-distance shot. In the case of the long-distance shot (a), the ROI needs to be extracted for magnification and playback.

Various methods have been studied to determine the ROI. For example, a paper by L. Itti, C. Koch, and E. Niebur, entitled "A model of saliency-based visual attention for rapid scene analysis", IEEE Transactions on Pattern Analysis and Machine Intelligence, vol. 20, no. 11, pp. 1254-1259, November 1998, proposes that, in order to find visually noticeable portions within images, a number of spatial/visual saliencies are expressed by a single saliency map based on a visual attention model. However, extension to moving images has not been considered properly in this model.

In addition, ROI determination in videos based on information regarding brightness, color, and motion is disclosed in a paper by W. H. Cheng, W. T. Chu, and J. L. Wu, entitled "A visual attention based region-of-interest determination framework for video sequences", IEEE Transactions on Information and Systems, E-88D, pp. 15781586, 2005. Based on an assumption that important objects have a high contrast of color or brightness, the researchers propose a method for designating the most salient point in each image frame. However, the above assumption is not always valid, because important objects may be dark or have a low contrast.

For the sake of video skimming and summarization, a paper by Y. F. Ma and H. J. Zhang, entitled "A model of motion attention for video skimming", in Proc. ICIP, pp. 129-132, 2002, proposes a video analysis method for providing a user-interested model by using motions, speeches, camera works, video editing information, etc.

Although the above-mentioned methods can be used to extract ROIs based on saliencies within video screens, they are not suitable for intelligent display. More particularly, in the case of a field sport video (e.g. soccer game video), shots requiring ROI extraction are mingled with those requiring no ROI extraction. In the former case, a number of small objects having saliencies may exist on the screen simultaneously. This means that a plurality of ROIs may exist, and such a situation is not suitable for an intelligent display method for mobile terminals, which aims at extracting only a portion from the screen for magnification and display.

In an attempt to solve these problems, an application P2006-28802 filed in the Korean Intellectual Property Office by KIM, Chang-Ik, et al., May 2006, entitled "An Intelligent Soccer Video Display Scheme for Mobile Devices", provides a display method including three steps: a ground color learning step, a shot classification step, and an ROI determination step.

However, the provided display method has a problem in that the processing time is lengthened by the first step (i.e. ground color learning step) during an initial period when each video starts. In addition, when the stadium currently displayed on the screen is replaced with another while a soccer game is broadcasted, it is difficult to properly adapt to the new ground color. During the third step for automatically determining the ROI, the ball is searched out for each frame. This means that the entire screen is searched for every frame. As a result, the processing rate cannot be increased further.

SUMMARY OF THE INVENTION

The present invention provides an intelligent display method for a multimedia mobile terminal, wherein, when the mobile terminal displays a sport game video, the ground pixel is extracted robustly for all types of soccer game videos without a ground color learning step, and the region of interest is extracted more quickly based on an improved ball search algorithm.

An intelligent display method for a multimedia mobile terminal is provided including the steps of: determining a type of a camera shot existing in a sport game video; determining that the camera shot is a long-distance shot and performing the steps of— deciding a region of interest within an image frame of the sport game vide, magnifying the region of interest, displaying the region of interest on the mobile terminal; and when it has been determined that the video shot is a non-long-distance shot, displaying the entire image frame on the mobile terminal.

BRIEF DESCRIPTION OF THE DRAWINGS

The patent or application file contains at least one drawing executed in color. Copies of this patent or patent application publication with color drawings will be provided by the U.S. Patent and Trademark Office upon request and payment of the necessary fee. The above and other features and advantages of the present invention will be more apparent from the following detailed description taken in conjunction with the accompanying drawings, in which.

DETAILED DESCRIPTION

Figure 1A:
FIGS. 1A, 1B and 1C illustrate examples of three types of shots existing in a conventional sport game video.
Figure 1B:
Figure 1C:

Hereinafter, exemplary embodiments of the present invention are described with reference to the accompanying drawings. In the following description, the same elements are designated by the same reference numerals although they are shown in different drawings. Further, various specific definitions found in the following description, such as specific values of packet identifications, contents of displayed information, etc., are provided only to help general understanding of the present invention, and it is apparent to those skilled in the art that the present invention can be implemented without such definitions. For the purposes of clarity and simplicity, a detailed description of known functions and configurations incorporated herein are omitted as it may make the subject matter of the present invention unclear.

An example of an embodiment of the present invention is described on an assumption that, among sport game videos, a soccer game video is displayed As used herein, a video refers to a sequence of shots as defined by equation (1) below, and each shot refers to an image sequence acquired as a result of a camera recording process.

$$\text{Video}=<\text{Shot}_0, \ldots, \text{Shot}_{k-1}> (K \text{ refers to the number of frames of the video}) \quad (1)$$

Wherein, K refers to the number of shots within the video, and each shot can be a series of frames as defined by equation (2) below.

$$\text{Shot}_k=<f^4_k, \ldots, f^{N-1}_k> \quad (2),$$

wherein $f^i_k$ refers to the $i^{th}$ frame of $\text{Shot}^k$, and N refers to the number of frames of the shot. Hereinafter, the $i^{th}$ frame is labeled $f_i$ throughout the entire video. The ROI of the $i^{th}$ frame of the $k^{th}$ shot can be expressed as $\text{ROI}(f^i_k)$. Depending on the type of the shot, the ROI corresponds to either the entire image frame or a part of it, as defined by equation (3) below.

$$\begin{cases} ROI(f^i_k) \subset f^i_k, \text{ if Class}(Shot_k) \text{ is a long-shot} \\ ROI(f^i_k) = f^i_k, \text{ if Class}(Shot_k) \text{ is not a long-shot} \end{cases} \quad (3)$$

This means that, when the image frame does not belong to a long-distance shot, the ROI is set to be identical to the original image and, when the image frame belongs to a long-distance shot, the ROI is set to be a part within the image frame.

Figure 2:
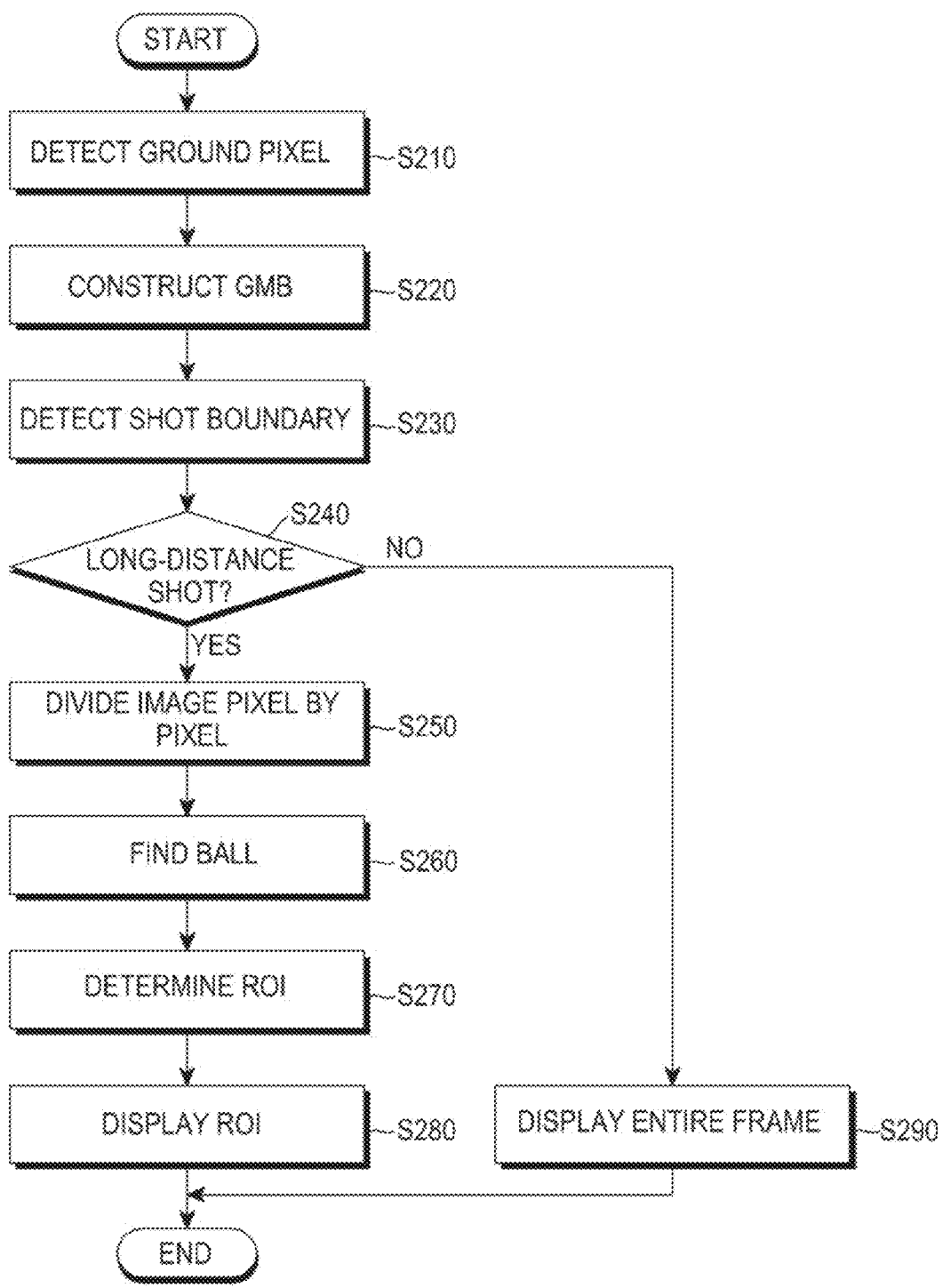
FIG. 2 illustrates an example of a flowchart having steps of an intelligent display method with regard to a sport game video, according to an embodiment of the present invention.

FIG. 2 is a flowchart showing steps of an intelligent display method with regard to a sport game video, according to an embodiment of the present invention.

Referring to FIG. 2, the intelligent display method includes the steps of: determining the type of a camera shot existing in a sport game video (steps S210-S240); when it has been determined that the camera shot is a long-distance shot, performing the steps of— deciding an ROI in an image frame of the sport game video, magnifying the ROI, displaying the ROI on a mobile terminal (steps S260-S280); and when it has been determined that the camera shot is a non-long-distance shot, displaying the entire image frame on the mobile terminal (step S290).

The step for determining the type of a camera shot existing in a sport game video further includes the steps of: detecting a ground pixel from the sport game video; differentiating between a ground region and a non-ground region (S210) with the detected ground pixel; dividing the ground region into n×n blocks for detection of a shot boundary detection and detection of a shot differentiation; constructing a ground block map (S220) from the divided ground region; checking a temporal block difference of the ground block map to detect the shot boundary (S230); and when the shot boundary is detected, determining the shot type by using the ground block map (step S240).

The step for deciding an ROI in the image frame of the sport game video when it has been determined that the camera shot is a long-distance shot, magnifying the ROI, and displaying it on the mobile terminal further includes the steps of: finding the location of a ball in the image frame (step S260); calculating the distance between the location of the ball and a previous display window; provisionally deciding the location of the ROI around the location of the ball; modifying the provisionally decided location based on the calculated distance; finally deciding the location of the ROI (step S270); magnifying the ROI; and displaying the ROI (STEP S280).

Respective steps for intelligent display processing of a sport game video for a multimedia mobile terminal according to the present invention are be described in detail.

Step S210: Ground Pixel Detection Step

A color of a ground is crucial to the analysis of a soccer video, particularly to a determination of a type of a shot. The present invention regards an amount of pixels of the ground color as an important clue to determination of the shot type. The ground color varies little by little depending on a video sequence, and it is necessary to detect a ground pixel of the video sequence at the initial step of the system (step S210).

According to an embodiment of the present invention, in order to divide $f_i$ into a ground region G and a non-ground region GC, the color corresponding to the ground must be detected successfully. In this case, every pixel within an image belongs to either G or GC without exception. A method for obtaining a two-dimensional array Ground(x, y) for each pixel (x, y) is defined by equations (4) and (5) below.

$$I(x, y) > 50, \quad (4)$$

$$\text{Ground}(x, y) = \begin{cases} 1 \text{ if } \begin{cases} ((85g > 95b) \text{ AND } (95g > 85r)) \\ (g - r) + b > 30 \text{ AND} \\ (I < 150) \end{cases} \\ 0 \text{ otherwise,} \end{cases}$$

Otherwise, (5)

$$\text{Ground}(x, y) = \begin{cases} 1 \text{ if } ((85g > 95b) \text{ AND } (95g > 85r)) \\ 0 \text{ otherwise,} \end{cases}$$

wherein intensity I refers to the average value of r, g, and b, and index (x, y) to r, g, b, and I has been omitted for simplicity of expression. As defined by equations (4) and (5), the ground pixel detection method is considered with regard to two cases.

More particularly, equation (4) is used in a normal situation or in a bright ground condition. That is, it is used to determine if a pixel belongs to the ground when the intensity of the pixel is at least 50.

Equation (5) is used to identify the ground when a very dark shadow is cast thereon.

The common condition in the first line of equations (4) and (5) uses the above-mentioned relationship g>r and g>b, i.e. characteristics of RBG values of pixels corresponding to the ground in a majority of cases. The multiplying constant is for the purpose of considering an exceptional case in which R is slightly larger than G regarding the proportion of RGB values of the ground.

The second condition of equation (4) is used to classify the uniform of players having a similar RGB value size proportion as that of the ground. For example, in the case of RGB values of the yellow uniform of a Brazilian national team, the size proportion is g>r and g>b just like the ground, but g and r have almost the same size value. In contrast, the value of b is very small. Such characteristics are considered when constructing the above-mentioned conditions and classifying the yellow uniform.

The last condition of equation (4) is used to differentiate the ball or line from the ground. This is based on a consideration that the ball and line are, in most cases, white. If a pixel has an intensity of 150 or higher, it is not regarded as belonging to the ground. It has been confirmed as a result of measurement of a pixel value corresponding to the ball, line, or player that the intensity of the pixel is at least 50. Therefore, if a pixel has an intensity of less than 50, it is enough to determine if the pixel corresponds to the ground.

This method is faster than the method proposed in a paper by A. Ekin, A. M. Tekalp, and R. Mehrotra, entitled "Automatic soccer video analysis and summarization", IEEE Transactions on Image Processing, vol. 12, pp. 796-807, 2003, and that proposed in a paper by K. Wan, X. Yan, X. Yu, and C. Xu, entitled "Real-time goal-mouth detection in mpeg soccer video", in MULTIMEDIA '03: Proceedings of the eleventh ACM international conference on Multimedia, pp. 311-314, ACM Press, (New York, N.Y., USA), 2003. Furthermore, the inventive method is still effective even when a shadow is cast on a part of the ground, as illustrated in FIGS. 3A, 3B, 3C and 3D.

Figure 3A:
FIGS. 3A, 3B, 3C and 3D illustrate examples of game scenes during a ground color differentiation step, according to an embodiment of the present invention.
Figure 3B:
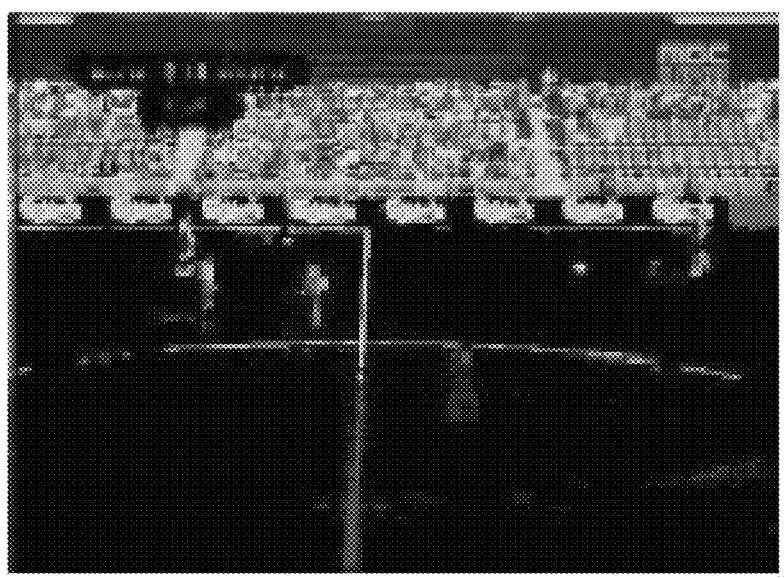
Figure 3C:
Figure 3D:

FIGS. 3A, 3B. 3C and 3D illustrates examples of game scenes during a ground color differentiation step, according to an embodiment of the present invention. In the drawings, FIGS. 3A and 3C correspond to game scenes with irregular sunlight. In the case of FIGS. 3B and 3D, ground portions existing in FIGS. 3A and 3C are differentiated by coloring them black regardless of varying sunlight.

Compared with previously proposed methods, which require a ground learning time of 30 frames, the inventive method of the present invention can identify the ground more quickly by using only the RGB value of pixels within the current frame.

Step S220: Ground Block Map Construction Step

In the previous step, each pixel has been subjected to a determination of whether or not it belongs to the ground. For the sake of rapid shot boundary detection and shot differentiation, shot boundary detection and shot differentiation are performed block by block, not pixel by pixel. The entire frame is divided into 16×16 blocks to construct a ground block map GB(i, j). Unlike conventional methods which deal with all pixels within a block, the inventive method of the present invention selects the central pixel value within the block region and decides if the central pixel value belongs to the ground by using a ground pixel detection algorithm. Based on the result, it is determined whether the corresponding block is a ground block or an object block, as defined by equation (6) below.

$$GB(i, j) = \begin{cases} 1 \text{ (ground block)} & \text{if Ground}(x_c, y_c) = 1 \\ 0 \text{ (non-ground block)} & \text{Otherwise,} \end{cases} \quad (6)$$

wherein $(x_c, y_c)$ refers to the x, y coordinate of the central pixel of the corresponding block. By solely using the central pixel in the block in this manner, it is possible to shorten the time necessary for block map formation and the subsequent entire shot classification step, compared with conventional methods using all pixels within the block. According to the embodiment of the present invention, the ground block map of frame $f_i$ is indicated by GB(i, j).

FIGS. 4A, 4B, 4C and 4D illustrate screens after filling small holes existing in ground block maps according to the prior art and an embodiment of the present invention, respectively. In the drawings, FIGS. 4A and 4B correspond to ground block maps before and after holes are filled in a method proposed in a paper by Keewon Seo and Changick Kim, entitled "A Context-Aware Video Display Scheme for Mobile Devices," in Proc. SPIE Vol. 6074, p.278-287, Multimedia on Mobile Devices II, San Jose, January 2006, and FIGS. 4C and 4D correspond to ground block maps before and after holes are filled in a method according to an embodiment of the present invention.

Figure 4A:
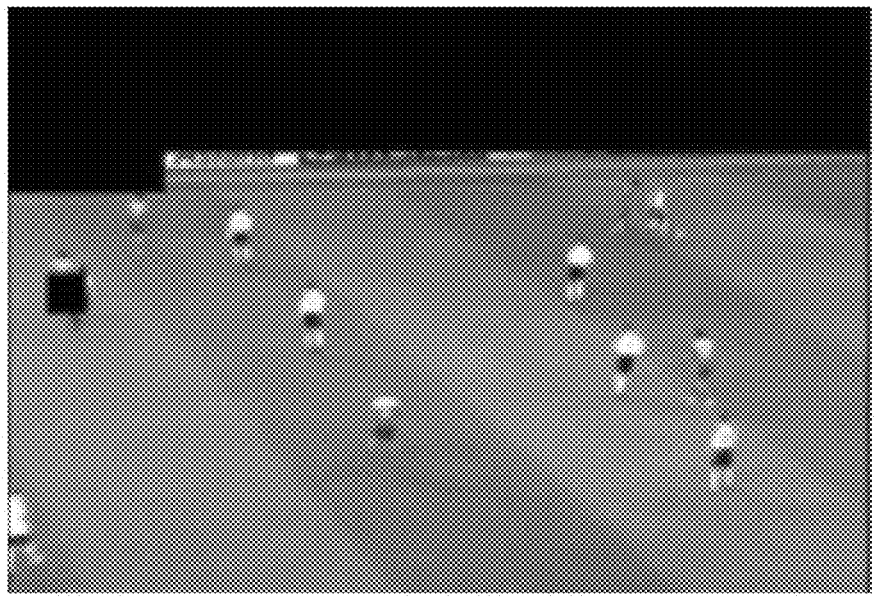
FIGS. 4A, 4B, 4C and 4D illustrate examples of screens after filling small holes existing on ground block maps, according to the prior art and an embodiment of the present invention, respectively.
Figure 4B:
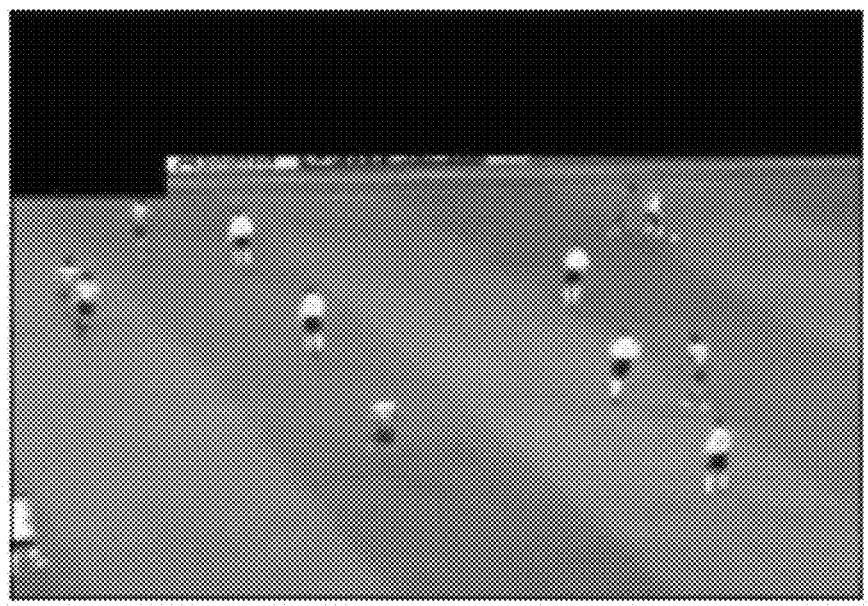
Figure 4C:
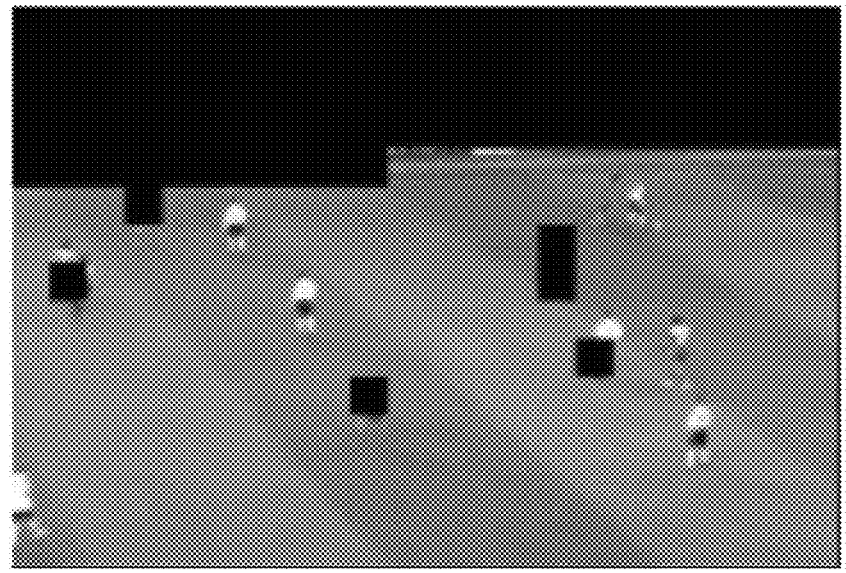
Figure 4D:
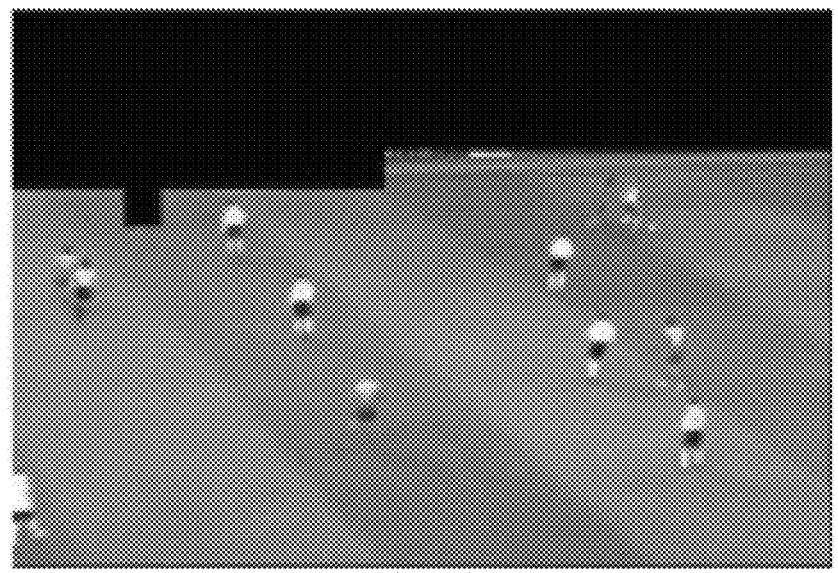

It is clear from FIGS. 4A, 4C, 4C and 4D that, in the case of FIG. 4C according to an embodiment of the present invention, small holes are more likely to occur than in the case of FIG. 4A. However, one or two holes can be filled in the vertical direction as defined by equation (7) below so that the final ground block map is at a satisfactory level.

$$GB(i,j)=1 \text{ if } [GB(i-1,j)=1 \text{ and } \{GB(i+1,j)=1 \text{ or } GB(i+2,j)=1\}] \text{ or } [\{GB(i-2,j)=1 \text{ or } GB(i-1,j)=1\} \text{ and } GB(i+1,j)=1] \quad (7)$$

Step S230: Shot Boundary Detection Step

Shot boundary detection is basic to video analysis. By classifying shots at the shot boundary only, it is possible to reduce the amount of calculation and decrease determination errors resulting from temporary change in the screen condition. This improves the accuracy of shot type determination. According to the present invention, in order to detect the shot boundary, the temporal block difference (hereinafter, referred to as TBD) of the ground block map is checked so as to detect the shot boundary efficiently and quickly.

$$TBD_i = \sum_x \sum_y \{GB_{i-5}(x, y) \otimes GB_i(x, y)\}, \quad (8)$$

wherein $\otimes$ refers to XOR operation. According to the present invention, i is designated as the shot boundary when $TDB_{i-1} < \theta_{ShotChange}$ and $TDB_i \geq \theta_{ShotChange}$ ($\theta_{ShotChange}=30$ used). In the case of a rapidly changing scene, a situation satisfying $TDB_i \geq \theta_{ShotChange}$ occurs frequently. Therefore, the boundary detection error is reduced by adding the condition $TDB_{i-1} < \theta_{ShotChange}$. The ground block map is compared with one of three frames prior, in order to cope with a gradual change of the shot due to fade-in/out or visual effects.

Step 240: shot type determination step

After the shot boundary is detected, the shot type must be determined on the spot. The present invention uses a ground block map to differentiate a long-distance shot and a non-long-distance shot.

After holes are filled, the longest green segment (hereinafter, referred to as LGS) is found for each column of the ground block map. The LGS is identified by comparing its length value displayed for each column, as illustrated in FIGS. 5A and 5B.

Figure 5A:
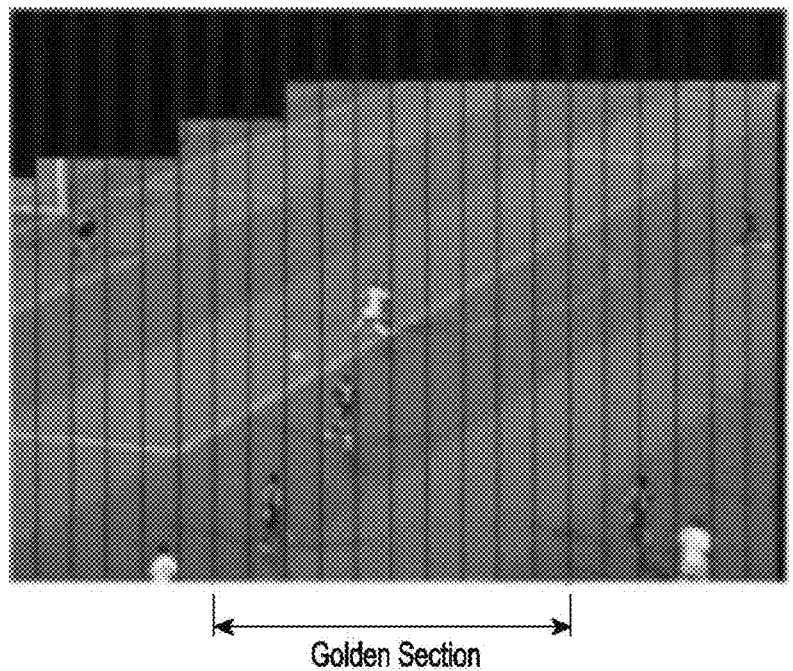
FIGS. 5A and 5B illustrate operation of a method for differentiating between a long-distance shot and a non-long-distance shot by using an LGS during a step for processing a sport game video, according to an embodiment of the present invention.
Figure 5B:
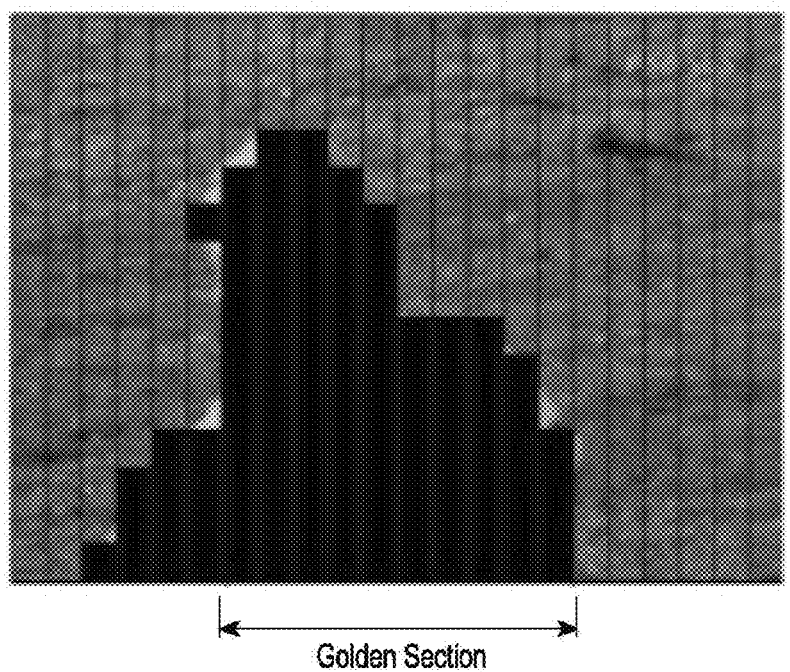

FIGS. 5A and 5B illustrates a method for differentiating between a long-distance shot and a non-long-distance shot by using an LGS during a step for processing a sport game video, according to an embodiment of the present invention. In the drawings, FIG. 5A corresponds to a long-distance shot, and FIG. 5B corresponds to a non-long-distance shot.

According to the present invention, the length of the LGS is measured in a golden section (when an image is divided in the horizontal direction at a ratio of 3:5:3, the central section corresponding to the ratio 5 is called the golden section) within each image frame so as to determine the shot type. It is assumed in the present embodiment that the golden section is identified in the horizontal direction only.

As illustrated in FIG. 5B, it is determined that a shot is not a long-distance shot even if one LGS smaller than $\theta_L$ exists. Particularly, (a) is regarded as a long-distance shot, and (b) is a non-long-distance shot.

$$Class(f) = \begin{cases} \text{Non-long-shot,} & \text{if } |LGS_k| < \theta_L \text{ for } GSLeft \leq k \leq GSRight \\ \text{Long-shot,} & \text{otherwise,} \end{cases} \quad (9)$$

wherein $\theta_L$=BlocksInColumn/3, GSLeft=BlocksInRow×3/11, and GSRight=BlocksInRow×8/11.

Step S250: Pixel-Based Object Separation Step

After the shot type is determined, each frame is classified into a long-distance shot or a non-long-distance shot based on equation (9). In the case of a non-long-distance shot, it is unnecessary to set an ROI smaller than the entire image frame. This is because it is enough to show the user the entire frame (S290). However, in the case of a long-distance shot, the ROI must be designated for magnification and playback. It is assumed in the description of the present invention that spectators are more interested in the peripheral situation of the ball. This means that, when the ROI is designated, information regarding the current and past locations of the ball is given the top priority. In order to find the ball, above-mentioned Ground(x, y) of equations (4) and (5) is used to construct a pixel-based binary image.

$$BinaryMap(x, y) = \begin{cases} 0 & \text{if Ground}(x, y) = 1 \\ 1 & \text{otherwise} \end{cases} \quad (10)$$

Figure 6A:
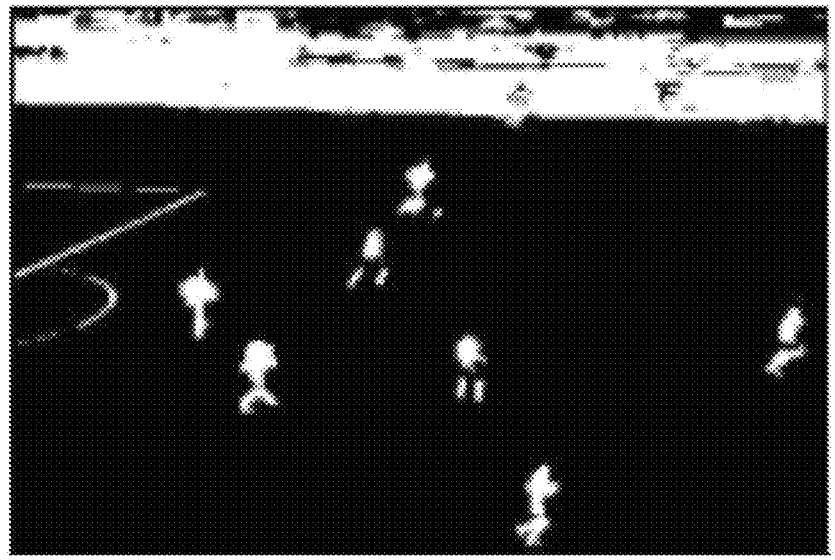
FIGS. 6A and 6B illustrate an example of a binary image and the minimum bounding rectangle of each object, which is detected by using a connected component labeling technique, during a step for processing a sport game video according to an embodiment of the present invention.
Figure 6B:
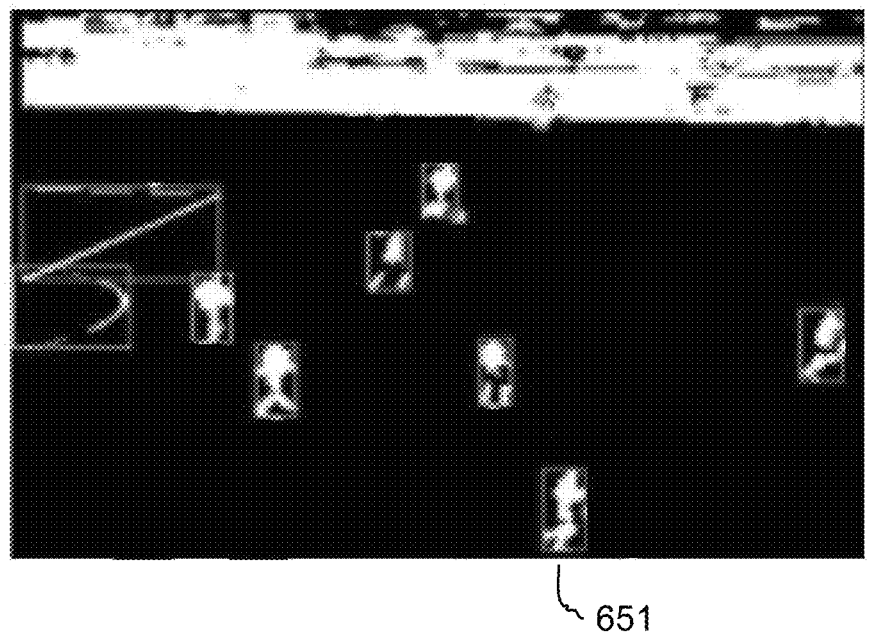

A resulting image is illustrated in FIG. 6A. This image is subjected to connected component labeling in eight directions to obtain the list of objects within the ground. The minimum bounding rectangle (hereinafter, referred to as MBR) of each object is white outline 651 in FIG. 6B. Objects are classified into balls, players, small objects similar to balls, and other objects according to their properties, including a horizontal/vertical ratio, average brightness, number of component pixels, etc. For example, if an object has an MBR with 4-20 component pixels and a horizontal/vertical ratio of 1.0-1.5, and if the intensity peak of the entire frame exists in the object, it is regarded as a ball.

Step S260: Ball Search Step

Even after the list of objects is obtained, it is difficult to determine which object is the real ball solely based on information regarding a single frame. This is because some objects (e.g. players' socks, shoes, lines) on the ground may be mistaken as the ball.

Furthermore, the ball may be hidden by players during the game or deformed when moving very fast. Some frames do not even include the ball. Various research has been conducted to track the ball. A method proposed in a paper by Y. Seo, S. Choi, H. Kim and K. Hong, entitled "Where Are the Ball and Players?", Soccer Game Analysis with Color Based Tracking and Image Mosaick, in ICIAP '97: Proceedings of the 9th International Conference on Image Analysis and Processing-Volume II, pp. 196203, Springer-Verlag, London, UK, 1997, has a problem in that the initial location of the ball must be designated manually. A method proposed in a paper by Y. Ohno, J. Miura and Y. Shirai, entitled "Tracking Players and a Ball in Soccer Games", in Int. Conf. On Multisensor Fusion and Integration for Intelligent Sys., Taipei, Taiwan, 1999, uses soccer images picked up by fixed cameras, and is not compatible with the present invention. A method proposed in a paper by X. Yu, C. Xu, H. W. Leong, Q. Tian, Q. Tang, K. Wan, entitled "Trajectory-Based Ball Detection and Tracking with Applications to Semantic Analysis of Broadcast Soccer Video", in MULTIMEDIA '03: Proceedings of the eleventh ACM international conference on Multimedia, pp. 11-20, ACM Press, (New York, N.Y., USA), 2003, has a problem in that, since information regarding subsequent frames is necessary to obtain the trajectory of the ball, real-time operation is impossible.

The present invention provides a method capable of processing broadcast images in real time based on a simple causal relationship with previous values.

First, it is assumed that a candidate ball tracked on the ground for the longest period of time is the most likely to be the actual ball. This can reduce the influence of temporary noise. If an object is newly found and classified as the ball, it is added to the ball candidate list that is being maintained. The ball candidacy is inherited by an object in the next frame, which has a similar location and properties. If the inheriting object is the ball, a counter is increased, but, if not, the counter is decreased. As a result, an object with the highest count is most probably the ball. An object with a counter below zero is no longer tracked. This method can find the real ball with a high probability. If the ball fails to be found because, e.g., no ball exits in the soccer game video, or the shape of the ball is not properly separated, the location of the most recently found ball is designated as the current location of the ball. If the ball cannot be found for three consecutive frames, the center of the screen is arbitrarily designated as the location of the ball. The number of frames as a reference for arbitrarily designating the location of the ball is not necessarily three, and may be varied as desired.

Figure 7:
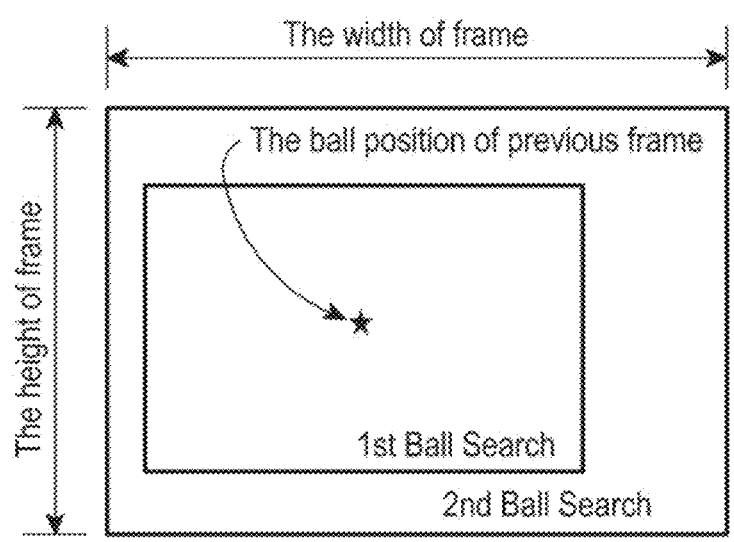
FIG. 7 illustrates an example of a ball finding method, according to an embodiment of the present invention.

FIG. 7 illustrates a method for finding the ball according to an embodiment of the present invention.

It is clear from FIG. 7 that, according to the present invention, the ball hardly varies its location during a soccer game when a frame changes. Based on this, the candidate ball is found not by searching the entire pixel region of the current frame, but by searching only the ROI with reference to the location of the ball in the previous frame (primary ball finding). The entire frame is searched only when the ball cannot be found in the ROI (secondary ball finding). This method improves search speed compared with conventional methods that search the entire frame every time.

Step S270: ROI Determination Step (Designation of ROI Window)

The simplest way to arrange an ROI window is to place the center of the ROI window at the location of the ball. However, when the center of the ROI follows the ball over a number of frames, it is likely that the screen vibrates or moves too fast to be viewed comfortably by the user. In other words, the ROI windows must move smoothly for comfortable viewing in the case of a small display. In addition, the concept of acceleration must be included in the method for moving the display window in contrast to a case in which the ball moves fast.

When a frame is determined to be a long-distance shot in the shot type determination step, the center point of the ROI window is initialized as the location of the ball, as defined by equations (11) and (12) below.

$$window_i = lob_i \quad (11)$$

$$disp_i = 0 \quad (12)$$

wherein $window_i$ refers to the center point of the display window in frame $f_i$; $lob_i$ refers to the location of ball in $f_i$; and $disp_i$ refers to the displacement corresponding to the actual movement of the ROI window in $f_i$. When long-distance shots appear consecutively, a different approach is adopted based on calculation of the distance between the ball location and the display window.

$$diff = lob_i - window_{i-1} \quad (13)$$

For brevity, a situation corresponding to a horizontal direction and diff≥0 will solely be considered without losing generality. Three cases will be considered according to the present invention (frame.width refers to the width of the frame).

Case 1: $0 \leq diff \leq disp_i$

This corresponds to a case in which the distance between the ball location and the center of the ROI window is shorter than the previous displacement. In this case, the location of the ROI window remains unchanged. Instead, the value of $disp_i+1$ is multiplied by a for decrease, as defined by equations (14) and (15) below.

$$windows_i = window_{i-1} \quad (14)$$

$$disp_{i+1} = a \cdot disp_i (0 < a < 1) \quad (15)$$

Case 2: $disp_i < diff \leq frame.width/2$

In this case, the ROI window is moved as much as $disp_i$, and $disp_i+1$ is modified according to equation (17). Since $|disp_i|>0$, the ROI window hardly moves in a direction opposite to the existing direction.

$$window_i = window_{i-1} + disp_i \quad (16)$$

$$disp_{i+1} = disp_i + a_1 \cdot sign(diff) \quad (17)$$

Case 3: frame.width/2<diff

This is the same as Case 2, except for a larger acceleration parameter against a case in which the ball moves fast ($0 < a_1 < a_2 < 1$), as defined by equations (18) and (19).

$$window_i = window_{i-1} + disp_i \quad (18)$$

$$disp_{i+1} = disp_i + a_2 \cdot sign(diff) \quad (19)$$

Figure 8:
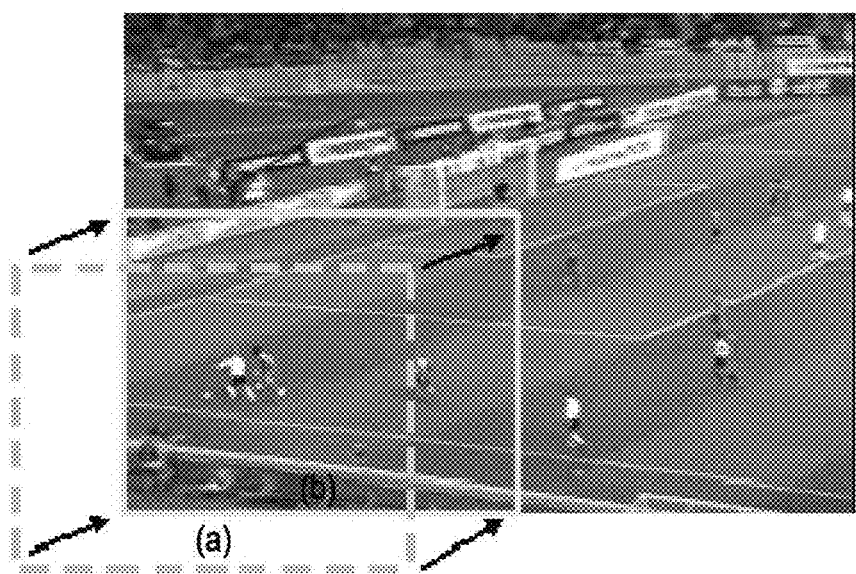
FIG. 8 illustrates an example of a step for locating an ROI window during a step for processing a sport game video, according to an embodiment of the present invention.

After the location of the display window is determined in this manner, processing as illustrated in FIG. 8 is conducted for display to the user. Even when the display window has been determined to be (a), the display window is relocated if it moves out of the frame, so that the contents inside the frame are displayed to the user (step S280). It is to be noted that $window_i$ used in the above step remains unchanged.

Figure 9A:
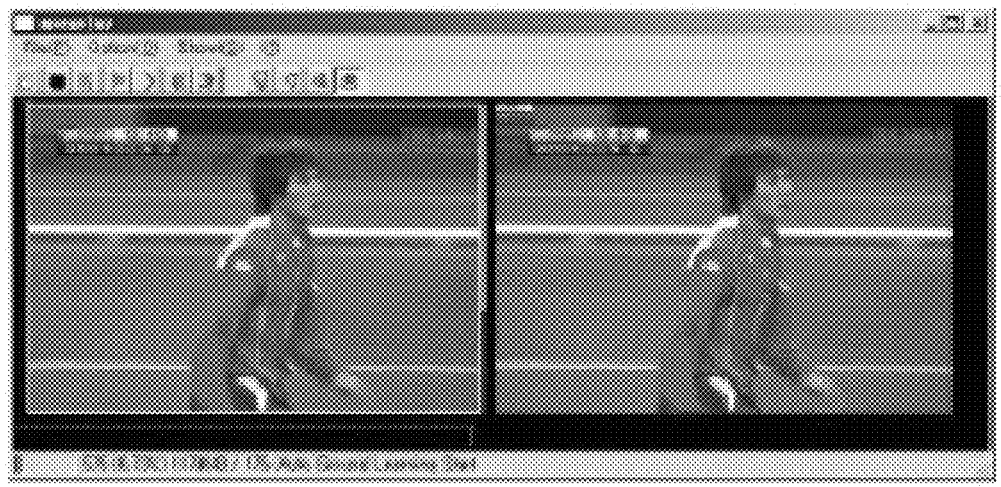
FIGS. 9A and 9B illustrate examples of screens displaying results of a step for processing a sport game video according to an embodiment of the present invention.
Figure 9B:

FIGS. 9A and 9B illustrate screens displaying results of a step for processing a sport game video according to an embodiment of the present invention. In FIG. 9A, corresponds to a non-long-distance shot, and FIG. 9B corresponds to a long-distance shot.

As illustrated in FIGS. 9A and 9B, in the case of the non-long-distance shot in FIG. 9A, the entire image frame is displayed in real time and, in the case of the long-distance shot in FIG. 9B, the ROI window white outline on the left original image is displayed after magnifying it up to the size of the right display window.

As such, when the user watches a soccer game video, images, in which objects appear smaller, are accurately selected, and the ROI existing therein is displayed efficiently.

As mentioned above, the present invention is advantageous in that, by using a method for detecting a ground region based on ground color information in a given soccer video, a method for automatically detecting a shot from which a region of interest needs to be extracted, a method for automatically designating a region of interest in a shot requiring its designation, etc., images, in which objects appear smaller, are accurately selected, and the region of interest existing therein is solely displayed. As a result, the user can watch the images in a more understandable and comfortable manner.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. An intelligent display method, operable in a processor in a multimedia mobile terminal, the method comprising the steps of:
   determining a type of a camera shot existing in an image frame of a sport game video comprising:
   detecting a ground pixel from the sport game video, said ground pixel being detected as:

$$I(x, y) > 50, \text{Ground}(x, y) = \begin{cases} 1 \text{ if } \begin{cases} ((85g > 95b) \text{ AND } (95g > 85r)) \\ (g - r) + b > 30 \text{ AND} \\ (I < 150) \end{cases} \\ 0 \text{ otherwise,} \end{cases}$$

$$\text{Otherwise, Ground}(x, y) = \begin{cases} 1 \text{ if } ((85g > 95b) \text{ AND } (95g > 85r)) \\ 0 \text{ otherwise,} \end{cases}$$

wherein, the intensity I is an average value of r, g, and b;
   differentiating between a ground region and a non-ground region based on the detected ground pixel;
   dividing the ground region into n×n blocks for shot boundary detection and shot differentiation;
   constructing a ground block map from the n×n blocks of the divided ground region;
   detecting a shot boundary from a check of a temporal block difference of the constructed ground block map; and
   when a shot boundary is detected, determining a type of the shot using the constructed ground block map, said type being selected from the group of shot types consisting of long distance shot and non-long distance shot;
   when it has been determined that the camera shot is a long-distance shot, performing the steps of:
   deciding a region of interest within the image frame;
   magnifying the region of interest, and
   displaying the magnified region of interest on the mobile terminal; and
   when it has been determined that the image frame is a non-long-distance shot,
   displaying the entire image frame on the mobile terminal.

2. The method as claimed in claim 1, wherein the step of deciding the region of interest further comprises the steps of:
   finding a location of a ball in the image frame;
   calculating a distance between the location of the ball and a previous display window;
   provisionally deciding a location of the region of interest around the location of the ball;
   modifying the provisionally decided location based on the calculated distance; and
   finally deciding the location of the region of interest.

3. The method as claimed in claim 1, wherein the step of constructing the ground block map further includes the steps of:
   selecting only a central pixel value within a block region;
   deciding if the central pixel value belongs to a ground by using a ground pixel detection algorithm; and
   determining whether a corresponding block is one of a ground block and an object block based on, $$GB(i, j) = \begin{cases} 1 \text{ (ground block)} & \text{if Ground}(x_c, y_c) = 1 \\ 0 \text{ (non-ground block)} & \text{Otherwise.} \end{cases}$$

wherein, $(x_c, y_c)$ refers to x, y coordinates of a central pixel of the corresponding block.

4. The method as claimed in claim 1, wherein the step of determining the shot type further comprises the steps of:
   finding a longest green segment for each column of the ground block map; and
   measuring a length of a longest green segment within a golden section in each image frame.

5. The method as claimed in claim 4, wherein the golden section is a central section corresponding to a ratio of 5 when an image is divided at a ratio of 3:5:3 in a horizontal direction.

6. The method as claimed in claim 1, wherein the step of determining the shot type further comprises the steps of:
   detecting the shot boundary by checking a temporal block difference of the ground block map; and
   determining whether the camera shot is one of a long-distance shot and a non-long-distance shot at the detected shot boundary only.

7. The method as claimed in claim 1, wherein, the step of deciding the region of interest further comprises the step of deciding the region of interest based on information regarding a location of a ball within the image frame and a location of the region of interest in a previous frame.

8. The method as claimed in claim 7, wherein the step of deciding the region of interest further comprises the steps of:
   finding a location of a ball in the image frame;
   calculating a distance between the location of the ball and a previous display window;
   provisionally deciding a location of the region of interest around the location of the ball;
   modifying the provisionally decided location based on the calculated distance; and
   finally deciding the location of the region of interest.

9. The method as claimed in claim 8, wherein, in the step of finding the location of the ball, pixel-based image division is performed with regard to the image frame so as to find the location of the ball.

10. The method as claimed in claim 8, wherein the step of finding a location of the ball further comprises the steps of:
    constructing a pixel-based binary image with regard to the image frame;
    performing connected component labeling in eight directions with regard to the pixel-based binary image to obtain a list of objects based on properties of respective objects;
    newly finding objects from the list of objects while maintaining a candidate ball list of newly found objects classified as the ball;
    adding an object to the candidate ball list, the object having been classified as the ball from the newly found objects; and
    deciding that a location of an object is the location of the ball, the object belonging to the ball candidate list and having been considered a ball candidate through a number of frames.

11. The method as claimed in claim 8, wherein, the step of finding the location of the ball further comprises the step of designating a center of a screen as the location of the ball when the ball fails to be found for a predetermined number of consecutive frames.

12. The method as claimed in claim 8, wherein, the step of finding the location of the ball further comprises finding a candidate of the ball by performing the steps of:
    searching the region of interest with reference to the location of the ball in a previous frame instead of searching an entire pixel region of a current frame; and
    searching the entire frame only when the ball fails to be found within the region of interest.

13. The method as claimed in claim 1, further comprising:
    when the region of interest moves out of the image frame, performing the step of relocating the region of interest so that contents within the image frame are magnified and displayed.

14. An apparatus for performing an intelligent display in a mobile terminal, the apparatus comprising:
    a processor in communication with a memory, the memory including code, which when accessed by the processor causes the processor to:
        identify each of a plurality of blocks of a known size as being one of a ground block and a non-ground block, by evaluating a ground block (GB) value of each central pixel within each block, wherein the central pixel is selected as representative of the corresponding block;
        construct, for an image frame, a ground block map based on the identified result;
        detect a shot boundary based on the constructed ground block map;
        when the shot boundary is detected, determine a type of a camera shot existing in an image frame using the constructed ground block map, wherein the type being selected from the group of shot types consisting of: long distance shot and non-long distance shot;
        display the image frame when the type of shot is determined to be the non-long distance shot; and
        decide a region of interest within the image frame and magnifying the region of interest, and displaying the magnified region of interest as the image frame when the type of shot is determined to be the long-distance shot.

15. The apparatus as claimed in claim 14, wherein the processor decides the region of interest by:
    finding a location of a desired feature in the image frame;
    calculating a distance between the location of the desired feature in the image frame and the location of the desired feature in a prior image frame;
    provisionally deciding a location of the region of interest around the location of the ball;
    modifying the provisionally decided location based on the calculated distance; and
    finally deciding the location of the region of interest.

16. The apparatus as claimed in claim 14 wherein the processor constructs the ground block map as:

$$GB(i, j) = \begin{cases} 1 \text{ (ground block)} & \text{if Ground}(x_c, y_c) = 1 \\ 0 \text{ (non-ground block)} & \text{Otherwise.} \end{cases}$$

wherein, $(x_c, y_c)$ refers to x, y coordinates of a central pixel of the corresponding block.

* * * * *